United States Patent Office 3,657,194
Patented Apr. 18, 1972

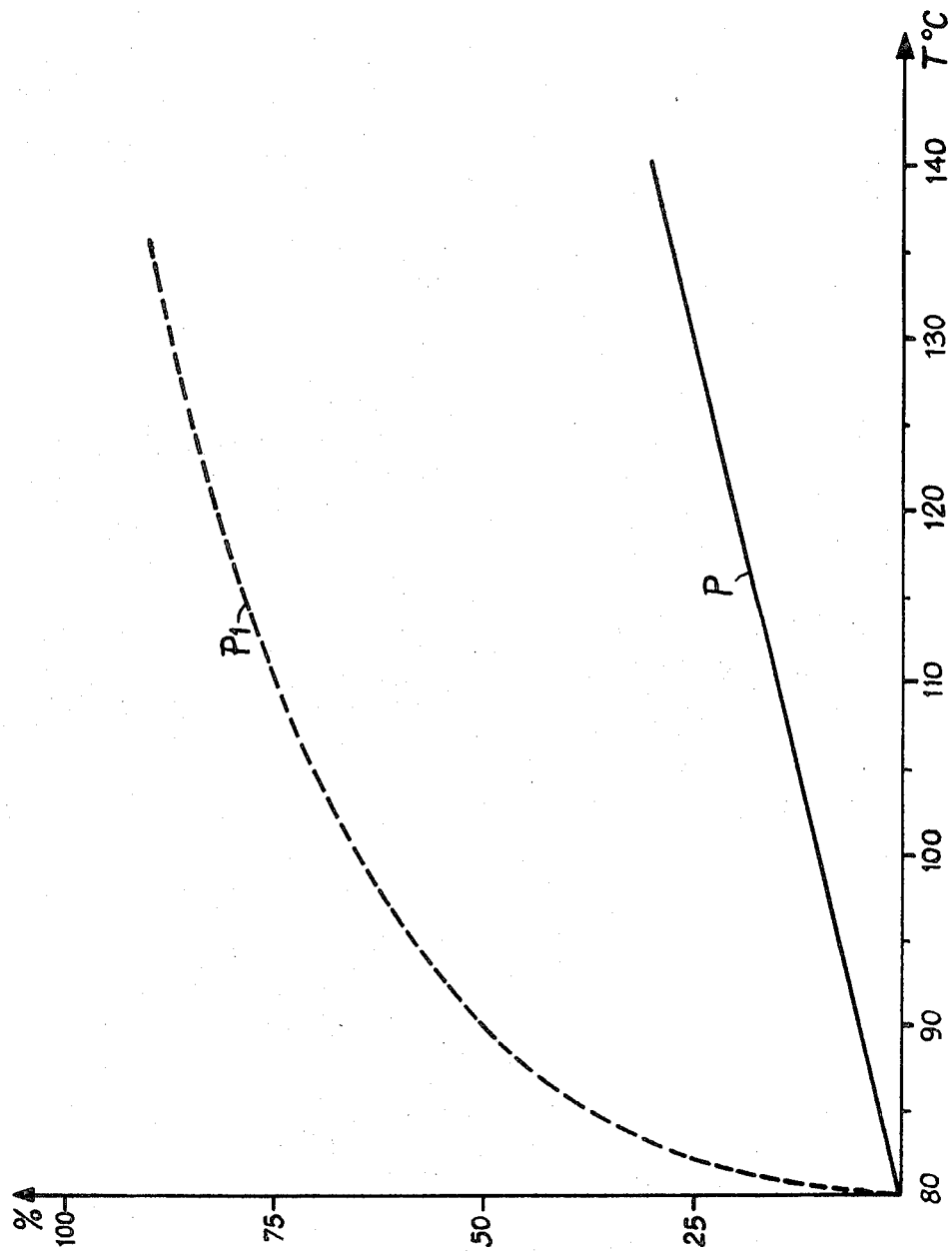

3,657,194
SOLUTION POLYMERIZATION OF LAURYL LACTAM
Michel Biensan, Billere, and Phillipe Bruant, Pau, France, assignors to Société Nationale des Petroles d'Aquitaine, Courbevoie, France
Filed Dec. 23, 1969, Ser. No. 887,556
Claims priority, application France, Dec. 31, 1968, 182,521
Int. Cl. C08g 20/18
U.S. Cl. 260—78 L
10 Claims

ABSTRACT OF THE DISCLOSURE

A process for the production of a polyamide in the form of a fine powder by heating a stirred solution of a monomeric lactam in an inert solvent containing an anionic polymerization catalyst and an anionic polymerization activator between 70°–150° C. is improved by starting the heating at 70°–95° C. and thereafter increasing the temperature whereat at each level of temperature T the amount $p\%$ of polymer powder present in the polymerization medium, expressed as a percentage of the total amount of polymer and monomer in the medium, is at least $0.5T-40$.

---

The invention relates to an improvement in the manufacture of lactam polymers in powder form, and more particularly of those of which the ring contains more than 10 carbon atoms; it is concerned particularly with the production of the poly-omega-lauryl lactam powder which is known under the name of "Nylon–12."

The polymerisation of lactams is normal procedure at the present time and the conventional method consists in using sodium as catalyst. Various activators have also been proposed, such as caprolactam-N-carboxyanilide, isocyanates, carbodiimides, cyanimides, acetyl lactams, triazines, urea, N-substituted imides and the like. When the operation is carried out in suspension or in solution, it is usual to work at temperatures of the order of 100° to 160° C. However, the polymerisation of lactams having more than 10 carbon atoms in the ring, and particularly the polymerisation of lauryl lactam, encounters a difficulty when it is desired to obtain a polymer in powder form—solid masses or agglomerates are produced, even with vigorous stirring, as soon as the temperature is raised with a view to accelerating the polymerisation. This circumstance is very inconvenient in industrial production, and it has not so far been possible to determine the exact causes and conditions of the setting effect which prevents a regular powder being obtained.

The present invention provides an improvement by which it is possible to avoid the setting of the polymer; it enables a regular powder to be manufactured without any risks.

The invention results from the unexpected discovery that, during a polymerisation of lactam in solution, with good agitation and with raising of the temperature, the polymer which is formed is indeed a powder and does not set in lump form if there is already formed in the solution a certain simple proportion of solid particles of the polymer. The minimum proportion of these particles, necessary for avoiding the setting, varies with the temperature, and it is larger as the temperature is higher. At relatively low temperatures, particularly at 80°, or in the region of 80° to 85° C., with suitable agitation, there are no dangers of any setting in lump form when the medium does not still contain particles of polymer, but the polymerisation is fairly slow, even in the presence of known accelerators. The danger of setting appears as soon as the temperature is raised, especially beyond 90° C. and particularly to 100–150° C., when it is desired to reach a speed of reaction and a yield appropriate for an industrial operation. In accordance with the invention, this danger can be avoided by a rise in temperature, carried out in a particular manner so that, at each instant, the reaction medium contains in suspension at least the minimum quantity of obtained pulverulent polymer, mentioned above, adapted to each temperature.

This discovery has led to the new process according to the invention for the polymerisation of lactams with more than 10 carbon atoms in their ring, in solution in an appropriate solvent, with a view to obtaining polymer in powder from, which consists in progressively raising the temperature of the solution containing the lactam or lactams, the catalyst and the activator, with continuous agitation, the desired temperature T at any given moment being established only when the medium already contains a quantity of dispersed powder formed of polymer, equal to $p\%$ of the total weight of monomer and polymer, defined by the formula $$p = aT - b$$

in which $a$ and $b$ are experimentally established constants, T being expressed in degrees centigrade.

In the important case of omega-lauryl lactam, the minimum percentage $p$ of obtained polymer required for each temperature is $$p = 0.5T - 40 \quad (a = 0.5;\ b = 40)$$

for a sufficient agitation of the order of 250 r.p.m. or more.

This indicates that, after having commenced the polymerisation at 80° C., the temperature must not be brought to 90° C., as long as the proportion of polymer powder which is formed has not reached $$p = 0.5 \times 90 - 40 = 5\%$$

When a conversion of 5% is reached or exceeded, there is no longer any risk of the raising of the temperature to 90° C. resulting in a setting in solid form.

Beyond 90° C., the above empirical formula leads, for example, to the minimum values of $p$ of:

10% for 100° C., 15% at 110° C., 20% at 120° C., 25% for 130° C. and so on.

From the foregoing, a rule for the conduction of the polymerisation becomes apparent, according to which the reaction medium must be maintained at a temperature level until its content of polymer powder in suspension reaches the value of $p\%$, which authorizes the passage to a higher level without any danger of setting. Thus, again using the numerical values indicated above, it is seen that, in order to pass from 90° to 100°, it is necessary to wait for $p$ to increase from 5 to 10%; at 100°, it is necessary to wait until $p$ rises from 10 to 15%, before raising the temperature to 110° C. In order to go from 110° to 120°, it is necessary to ensure that $p$ has reached 20%.

It is obvious that the temperatures as indicated above are given simply by way of example; the temperature levels can be at any desired values, which are chosen between 80° C. and 150° C., the melting point of omega-lauryl lactam, and preferably between 85° and 135° C. On the other hand, the value of the temperature spacing or gap between two successive temperatures is not in any way critical; it can vary according to the choice of the operator, for example, between 1° and 30° C. As a limiting case, the rise in temperature can be continuous and such a continuous raising of the temperature is highly advantageous.

Whatever may be the values of the spacings between temperature gradients and the values of these latter, the conduction of the polymerisation in accordance with the invention requires the knowledge of the content of particles of polymer in the reaction medium at any instant. This content can easily be determined, in known manner, on a sample of the suspension, for example, by separation of the solid and direct weighing, by the measurement of the decanted volume, by nephelometry or any other appropriate method. However, on the industrial scale, if the polymerisation is carried out so as to satisfy the condition $p=aT-b$, a continuous control of $p$ is not required; it is sufficient to determine, once for all, the time which is necessary at each temperature to reach the conversion $p$ according to the invention; then, during manufacture, it only remains to respect the durations thus found, that is to say, to effect the rises in temperature at the same speed.

In fact, a practical corollary of the invention as defined above consists in raising the temperature during polymerisation at a speed such that the proportion of solid polymer $p=aT-b$, necessary at each temperature T, has the time to be formed. If $v$ is the polymerisation speed in percent per minute, for example, in a given temperature interval, the time required to reach $p\%$ of polymer in this interval is $p/v$ minutes. It is thus a simple matter to translate the fundamental condition of the invention into durations from the knowledge of the curve of the polymerisation speed.

In order to avoid any accidental setting or lump formation, which could result from fluctuations in the stirring or other factors during polymerisation, it is advisable to carry out the operation in such a way that, at each temperature, the quantity of polymer already formed is clearly higher than the lower limit required of $p$.

Consequently, the content of formed polymer is preferably between $p$ and $p_1$, $p_1$ being larger than $p$, that is to say between $(aT-b)$ and $p_1$. In the case of the omega-lauryl lactam, given above as an example, the preferred content of polymer already present at this temperature is between $p=0.5T-40$ and $p_1=24(T-80)^{\frac{1}{3}}$, $p_1$ being determined by the corresponding curve appearing as a graph.

In the accompanying drawing, the two curves, drawn one above the other, give the preferred ranges of the percent of formed polymer in relation to the total of polymer+monomer, as a function of the polymerisation temperature, T in degrees centigrade, the lower curve ($p$) being drawn from a series of polymerisation tests carried out at 80°, 90°, 110° and 135° C., under the general conditions of the example given below, with a stirring at 430 r.p.m. At each of these temperatures, a series of polymerisation reactions is carried out, and a note is taken of the proportion ($p$) from which there is no longer any solidification, the polymerisation leading to a regular polymer powder which is well-dispersed in the reaction medium. In this way, it was confirmed that, between 70° and 80° C., there was no need to take the precautions according to the invention for obtaining a pulverulent product; at the higher temperatures, it was necessary to have a conversion which was greater as the temperature was higher.

The following table sets out the results of these tests: the figures indicate the percentages of pulverulent polymer which are obtained, expressed by reference to the total of polymer+monomer.

| T (degrees) | Solidification | Obtaining of powder |
|---|---|---|
| 80 | | |
| 90 | 0 | 5 |
| 110 | 10 | 15 |
| 135 | 20 | 27.5 |

It is the data of the last column, corresponding to the obtaining of the polymer in powder form, which have served for the drawing of the lower curve ($p$) in the accompanying graph.

The tests referred to above foreshadow a particularly practical embodiment of the invention, which consists in dispersing in advance, in the monomer to be polymerised, a few percent of pulverulent polymer, so as always to have in the reaction medium slightly more $p\%$ of polymer; the result of this procedure is a greater certainty of not risking any setting or solidification. Such a previous addition corresponds graphically to the operation above the lower curve $p$, particularly between the two lines $p$ and $p_1$. This addition can constitute about 1 to 15% of the weight of monomer, particularly 8 to 10%.

According to one preferred form of the invention, the catalyst and/or the activator being used are introduced continuously while the temperature is rising. This continuous introduction can take place throughout the entire polymerisation or only until there is a certain degree of conversion, which can be greater than or equal to 20%, after which the activator and/or the catalyst are introduced all at once.

The process of the invention is moreover applicable to the various variants of the known polymerisation of lactams in the presence of anionic catalysts and various activators. Thus, with sodium methylate or sodium hydride, the advantages of the new process are obtained just as well in the case of the addition of an activator to the medium which has already been subjected to a heating with the catalyst, as in a variant in which this latter and the activator are introduced at the same time, the subsequent heating being more moderate.

The examples which follow illustrate the invention in a non-limiting manner.

EXAMPLE 1

The polymerisation is carried out in a 2-litre reactor, equipped with a mechanical agitator, a reflux condenser, a dry nitrogen flushing system and also openings for the introduction of the reactants. Into this vessel are introduced 400 ml. of xylene, twice distilled with $CaH_2$, and 300 g. of omega-lauryl lactam, which is caused to dissolve in the xylene at 120° C.

To the lactam solution are added 2 mole percent of NaH, i.e. 0.72 g., and the reaction is allowed to take place for 15 minutes at 120° C. The temperature is then lowered to 85° C., and 2 moles of activator, N-phenyl carbamyl caprolactam, i.e. 7 g., are progressively introduced in 5 minutes into the solution. The polymer, which is immediately formed, is a fine powder which disperses well in the liquid. After heating for 10 minutes at 85° C., the temperature is raised by 10° every 10 minutes; thus, after 50 minutes, a temperature of 135° C. is reached, and the medium is kept at this temperature for 30 minutes, bringing the total heating period to 80 minutes. Under these conditions, the proportion of already formed polymer relative to the initial monomer is 32% at 85° C., 50% at 90° C., 60% at 95° C., 66% at 100° C., 73% at 110° C., 79% at 120° C., and 88% at 135° C., corresponding practically to the curve $p_1$ of the drawing as previously described. After 30 minutes at 135° C., the polymerisation is stopped, the liquid is cooled and filtered. The separated powder is washed with methanol and dried. In this way, after a total polymerisation time of 80 minutes, there is obtained 270.5 g. of polymer which is entirely in the form of a fine powder having particles with a size of approximately 40 to 300 microns, and representing a yield of 90%. The relative viscosity of this polymer in meta-cresol at 20° C. is 1.67.

EXAMPLE 2

The polymerisation is effected in the same manner as in Example 1, but the rise in temperature up to 135° C., in stages, is twice as fast; it is raised by 10° every 5 minutes. Thus, 135° C. are reached in 25 minutes and the medium is kept at this temperature for 55 minutes; the total polymerisation time is thus 80 minutes, as in Example 1. The yield is still 90%, but the polymer is in the form of a mixture of agglomerates of variable size between 0.5 and 5 mm., and of only about 30% of fine powder, like that of Example 1.

EXAMPLE 3

The reactor and the reactants are the same as in Example 1, but the sodium hydride is introduced into the solution of lactam in xylene at 85° C., and immediately after the addition of the activator. Under these conditions, NaH reacts slowly with the lauryl lactam and the initial polymerisation period is more progressive. The heating at 85° C. is therefore extended for 20 minutes before raising the temperature, in stages, to 135° C., as in the preceding examples. The yield and the nature of the polymer powder are the same as in Example 1, but the certainty of the initial polymerisation phase between 85° and 95° C. is even greater.

EXAMPLE 4

Into a 20-litre reactor, equipped with an anchor-type agitator, a reflux condenser and an opening for the introduction of the reactants, are introduced 4.8 kg. of dry lactam-12 and 8.5 litres of anhydrous xylene.

The contents of the reactor are stirred at a speed of 350 r.p.m. and brought to 100° C.; 24 g. of NaH, 50% in a mineral oil, are introduced and allowed to react for 15 minutes at 100° C. The reaction medium is then cooled to 85° C. and 480 g. of anatase ($TiO_2$) are added, i.e. 10% by weight of the lactam. 86.4 ml. of phenyl isocyanate, in solution of 500 ml. of anhydrous xylene, are then introduced continuously for 1 hour. During this time, the temperature is progressively raised, following the curve $p_1$, up to 135° C., and it is maintained at this value for another hour. After cooling and emptying the reactor, the reaction mixture is filtered under vacuum, and the powder thus obtained is washed twice with 5 litres of methanol. The powder is then dried for several hours at 100° C. under vacuum. In this way, 5.2 kg. of fine polyamide powder are obtained, representing a yield of 98.1%.

The inherent viscosity of the resulting product in meta-cresol is 1.03.

The grain size of the powder, evaluated by screening, is smaller than 160 microns.

By spraying this powder by means of an electrostatic pistol onto a metallic plate, an excellent white coating of polyamide-12 is obtained.

EXAMPLE 5

The general conditions are the same as in Example 4, but the reaction medium is only cooled to 95° C., the speed of agitation is 300 r.p.m. and the $TiO_2$ powder is replaced by 400 g. of fine polyamide-12 powder, that is to say, about 8.3% relatively to the weight of lactam. There are then obtained 5 kg. of fine polyamide-12 powder, corresponding to a yield of 96% relatively to the lactam being used, allowing for the added powder.

The inherent viscosity in meta-cresol of this product is 1.00. The grain size, determined by moist screening, is below 400 microns.

EXAMPLE 6

In this example, the activator used was acetyl caprolactam.

In a series of operations which were carried out, 600 g. of lactam-12 were dissolved in 900 ml. of xylene at 120° C. 2 mole percent of NaH, i.e. 1.44 g., were added and then, after cooling to 95° C., 8% of fine polyamide powder were introduced into the solution. 50 ml. of xylene, containing acetyl caprolactam in solution, in a total quantity equal to 2 mole percent relatively to the lactam, i.e. 9.3 g., were introduced dropwise over a period of 1 hour into the stirred reaction medium. During this hour, the temperature was raised progressively to 135° C.

After a total polymerisation time of 2 hours, the second hour being at 135° C., and after separating and washing of the polymer, fine powder with little agglomerate was collected, in quantities which represented 65 to 85% of yield.

The powders obtained had inherent viscosities in meta-cresol in the region of 1; their average grain size was about 30 to 1000 microns.

EXAMPLE 7

By replacing the activator used in Example 6 by acetyl dodecanolactam, a yield of about 60%, an inherent viscosity of about 0.95 and a grain size from 40 to 1000 microns were obtained.

EXAMPLE 8

The replacement of the acetyl caprolactam of Example 6 by benzoyl caprolactam resulted in a yield of 75% and viscosities and grain sizes similar to those of Example 6.

EXAMPLE 9

A polymerisation, under the general conditions of Example 6, was carried out with 300 g. of lactam-12 in 400 ml. of xylene, in the presence of 8% of previously introduced fine polyamide powder and 2 mole percent of diphenylcarbodiimide.

With a starting temperature of 95° C., a yield of 88% of polymer powder was obtained. The powder had an inherent viscosity of about 0.9 and the mean size of the particles was of the order of 500$\mu$.

EXAMPLE 10

The polymerisation is carried out in the same apparatus as in Example 1. Into this vessel are introduced 400 cc. of Decalin and 300 g. of omega-lauryl lactams, which are caused to dissolve at 120° C., and 5% of fine polyamide powder. To the lactam solution are added 2 mole percent of NaH, i.e., 0.72 g., which is allowed to react for 15 minutes at 120° C. The temperature is lowered to 85° C. and 2% of acetyl dodecanolactam in solution in 100 cc. of Decalin are carefully introduced. The temperature is progressively raised to 135° C., following the curve $p_1$, for one hour. This temperature is maintained for another hour. Polyamide-12 powder with a grain size smaller than 500 microns is obtained with a yield of 65%.

EXAMPLES 11 TO 13

In these examples, the behaviour of three different solvents was studied.

The polymerisation was carried out on 300 g. of lactam-12 in 400 ml. of thoroughly dry solvent and 2% of NaH, the dissolving taking place at 120° C.

The medium was stirred at 500 r.p.m. At 85° C., there was commenced the continuous introduction of 2 mole percent of carboxanilide in solution in 100 ml. of the same solvent as that which served for dissolving the lactam. This introduction lasted 1 hour, during which time the temperature was raised progressive from 85 to 135° C. The mixture was then heated for 1 hour at 135° C. Thus, the total polymerisation time was 2 hours.

The results of these polymerisation reactions are given below.

| Example Number | 11 | 12 | 13 |
|---|---|---|---|
| Solvent | Cumene | Dichlorobenzene | Decalin |
| Yield | 98 percent | 95 percent | 91 percent |
| Viscosity | 1.03 | 1.08 | 1.15 |
| Average grain size in microns | 15 to 70 | About 20 | 10 to 30 |

The foregoing examples show that, by means of the process according to the invention, it is possible to obtain a polymer powder with a desired grain size without any formation of lumps and with good yields.

EXAMPLE 14

The two-litre reactor of Example 1, equipped with a mechanical agitator, a reflux condenser, a dry nitrogen draining system and openings permitting the introduction of the various reactants, is used.

660 g. of lactam-12 are melted at 170° C. and 2 mole percent of sodium methylate are introduced at this temperature, being allowed to react for 1½ hours. The temperature is then lowered to 85° C., while introducing thereinto 900 cc. of xylene twice distilled with $CaH_2$.

At this moment, the activator (2% of caprolactanilide) in solution in 100 cc. of xylene is introduced, regulating the rate of flow so that this introduction lasts one hour.

At the same time, the temperature is raised by 10° C. every 10 minutes, so as to reach 135° C. after one hour; the completion of the introduction of the activator coincides with the end of the temperature program. Reaction is allowed to continue for 1 hour at 135° C. The reaction is stopped, the substance is filtered, washed with methanol and dried.

In this way, there are obtained 595 g. of fine powder (yield of 95%, taking into account the fact that the activator was diluted in a little lactam-12.)

We claim:

1. In a process for the production of a polyamide in the form of a fine powder without concurrent production of agglomerates by heating a stirred solution of monomeric lauryl lactam in an inert solvent containing an anionic polymerization catalyst and an anionic polymerization activator between 70° and 150° C., the improvement which consists of starting the heating at 70°–95° C. and thereafter increasing the temperature wherein at each level of temperature T the amount p% of polymer powder present in the polymerization medium, expressed as a percentage of the total amount of polymer and monomer in the medium, is at least 0.5T–40, and thereafter recovering the finely pulverulent polymer from the polymerization medium, wherein T is the temperature in degrees centigrade.

2. The process of claim 1 wherein 1% to 15% of a fine powder or polylauryl lactam, with respect to the monomer, is added to the polymerization medium at the start of the heating.

3. In a process for the production of lauric polyamide in the form of a powder without the concurrent production of agglomerates by heating a stirred solution of monomeric omega-lauryl lactam in an inert solvent containing an anionic polymerization catalyst and an anionic polymerization activator between 70° and 150° C., the improvement which consists of starting the heating at 70°–80° C. and the temperature being increased at a rate such that each level of temperature T is reached only when the amount p% of polymer powder present in the polymerization medium, expressed as a percentage of the total amount of polymer and monomer in the medium, is at least 0.5T–40, and thereafter recovering the resulting finely pulverulent polymer particles from the polymerization medium, wherein T is the temperature in degrees centigrade.

4. The process of claim 3 wherein the temperature level T is reached when p% is between 0.5T–40 and $24(T-80)^{\frac{1}{3}}$.

5. The process of claim 4 wherein the catalyst is an alkali metal, and wherein the activator is selected from the group consisting of N-phenyl carbamyl caprolactam, phenyl isocyanate, acetyl dodecalactam, acetyl caprolactam, benzoyl caprolactam, diphenyl carbodiimide, carboxanilide and caprolactanilide.

6. The process of claim 5 wherein the alkali metal employed is in the form of a methylate.

7. The process of claim 4 wherein the catalyst is sodium hydride, and wherein the activator is selected from the group consisting of N-phenyl carbamyl caprolactam, phenyl isocyanate, acetyl dodecalactam, acetyl caprolactam, benzoyl caprolactam, diphenyl carbodiimide, carboxanilide and caprolactanilide.

8. The process of claim 7 wherein the temperature during heating is in the range of 85° to 135° C.

9. The process of claim 7 wherein the inert solvent is selected from the group consisting of xylene, cumene, dichlorobenzene and decaline.

10. The process of claim 7 wherein 1 to 15 percent by weight of polylauryl lactam powder, with respect to the amount of monomer lactam, is added to the polymerization medium at the start of the heating.

References Cited
UNITED STATES PATENTS

| | | | |
|---|---|---|---|
| 3,061,592 | 10/1962 | Schnell et al. | 260—78 L |
| 3,451,976 | 6/1969 | Lucas | 260—78 L |
| 3,484,415 | 12/1969 | Sahler | 260—78 L |

HAROLD D. ANDERSON, Primary Examiner

L. M. PHYNES, Assistant Examiner